United States Patent [19]

Kato

[11] 4,441,688

[45] Apr. 10, 1984

[54] BONNETLESS COMPACT DESIGN GATE VALVE

[76] Inventor: Tomozo Kato, 32-6, Edogawa 6-Chome, Edogawa-Ku, Tokyo, 183, Japan

[21] Appl. No.: 330,309

[22] PCT Filed: Jun. 5, 1981

[86] PCT No.: PCT/JP81/00131

§ 371 Date: Dec. 10, 1981

§ 102(e) Date: Dec. 10, 1981

[87] PCT Pub. No.: WO82/04300

PCT Pub. Date: Dec. 9, 1982

[51] Int. Cl.³ .................. F16K 3/12; F16K 41/02
[52] U.S. Cl. .................................... 251/327; 251/328; 251/329
[58] Field of Search ................. 251/327, 329, 328

[56] References Cited

FOREIGN PATENT DOCUMENTS

| | | | |
|---|---|---|---|
| 581395 | 8/1959 | Canada | 251/327 |
| 1251380 | 12/1959 | France | 251/329 |
| 599613 | 11/1959 | Italy | 251/327 |
| 182952 | 3/1963 | Sweden | 251/327 |
| 471417 | 9/1937 | United Kingdom | 251/329 |

Primary Examiner—Arnold Rosenthal
Attorney, Agent, or Firm—Flynn, Thiel, Boutell & Tanis

[57] ABSTRACT

A bonnetless outside-screw type gate valve made of carbon steel, 3½ nickel steel or other stainless steel material is provided. A yoke 18 is directly screw-joined to the body 1 in which a stuffing box 7 is provided, and a flanged cylindrical buck seatring 16 is screwedly fixed to the lower portion of said stuffing box 7. Seat rings 15 are pressedly attached against a raised fixing surface portion 12 in the fluid conduit hole 11 with the cylindrical end portion of each said seat ring being bent into the stepped edge of said fixing surface portion 12 to thereby fix said seat rings in position.

3 Claims, 3 Drawing Figures

BONNETLESS COMPACT DESIGN GATE VALVE

DESCRIPTION

1. Field of the Art

This invention relates to a bonnetless compact design gate valve in which a yoke is directly screw-joined, with no bonnet being provided, to the body of an outside-screw type compact design gate valve having its fluid conduit passage smaller in diameter than the pipeline connected thereto, thereby to attain a weight reduction of the valve. Further, the seat ring to be fixed in said fluid conduit passage is so designed that it will not become loose in use and is effective for shutting off the high pressure fluid.

2. Background of the Art

There are known outside-screw type compact design gate valves having their fluid conduit passage formed smaller in diameter than the pipeline connected thereto. Such gate valves are generally standardized in, for instance, the American Petroleum Institute Standard 602, and they are widely used in petroleum refining systems and other petrochemical apparatuses. Usually, a gate valve is used for the purpose of shutting off or passing a fluid in a pipeline, and it is so constructed that the gate is moved perpendicularly to the fluid contact passage to fully open or fully close said passage. In order to minimize the pressure loss of the fluid passing therethrough, the fluid conduit passage is formed equal in diameter to the pipeline connected to the valve.

In the case of the small-sized, or so-called compact design gate valve, the fluid conduit passage is formed smaller in diameter than the pipeline connected thereto so that there is a certain pressure loss of the fluid, thereby to attain a sizable reduction of the unit valve weight as well as the weight of the whole apparatus using a plurality of such valves and to also realize an improvement of the working efficiency of piping assemblage and a saving of labor. However, these small-sized gate valves are substantially of the same construction as the large-sized gate valves known in the art. That is, both the body and the bonnet have the respective integral flanges which are joined together by bolts to integrally combine the body and bonnet. Therefore, even though the fluid conduit passage of the valve is formed smaller in diameter than the pipeline connected thereto to attain a certain weight reduction of the unit valve, such effort is not fully effective because of the provision of thick flanges and strong bolts used for joining the body and bonnet.

Further, at the joint of said flange a gasket is provided for preventing leakage of the fluid from this section. This gasket has sufficient toughness and is designed to attach tightly enough to inhibit leakage of the fluid in use of the valve, but once a leakage of the fluid occurs, there is no effective measure to check such leakage. If leakage occurs from the gasket joint, there is no alternative but to replace the gasket with a new one by blocking the fluid flow in the pipeline connected to the valve and disconnecting the body and bonnet.

Moreover, in the case of a valve with a small diameter such as less than 2 inches, it is extremely difficult to properly fix in the conduit hole the seat ring which is adapted to attach against the corresponding face of the wedge-shaped gate to block the fluid flow. As means for fixing the seat ring, there are known the following two methods: a screw is formed on the outer peripheral wall of the seat ring and it is screwed into the fluid conduit hole provided with a mating screw; or the seat ring is formed cylindrically and it is expanded after it has been fitted into the fluid conduit hole. However, the former method has difficulties in providing a screw thread in the direction not parallel to the fluid conduit hole but vertical to the wedge face of the gate, that is, transverse to the fluid conduit hole. On the other hand, according to the latter method in which the seat ring is merely expanded in and pressed against the fluid conduit hole, there could occur sliding between the pressed faces when, for example, a high-temperature fluid is blocked, due to a difference in coefficient of linear expansion owing to a difference in material between the body and the seat ring, resulting in loosening of the seat ring in use of the valve and an improper blocking function of the valve.

OBJECT OF THE INVENTION

This invention has for its object to provide a bonnetless compact design gate valve which is free of the said defects of the prior gate valves, in which no fluid leakage from the gasket occurs and which is light in weight and small in size and also features a modification of the shape of the fluid conduit hole in which the seat ring is fixed and secured against loosening.

DISCLOSURE OF THE INVENTION

According to the present invention, a yoke is directly joined to the body instead of forming it integral with the bonnet or joining it to the separate bonnet as in the conventional gate valves. This can eliminate the need for the flanges and bolts which are otherwise required for joining the body and the bonnet. It also eliminates the need for the use of a gasket, thus eliminating any possibility of fluid leakage from the gasket. Also, a stuffing box, which has been provided in the bonnet in the conventional gate valves, is formed in the body in the present invention. Further, the seat ring is pressed against a raised fixing surface portion of the fluid conduit hole and is fixed in position by the bent edge of said fixing surface portion. Thus, the seat ring, once fixed in position, is set stably with no likelihood of loosening.

THE BEST MODE OF CARRYING OUT THE INVENTION

Figure 1:
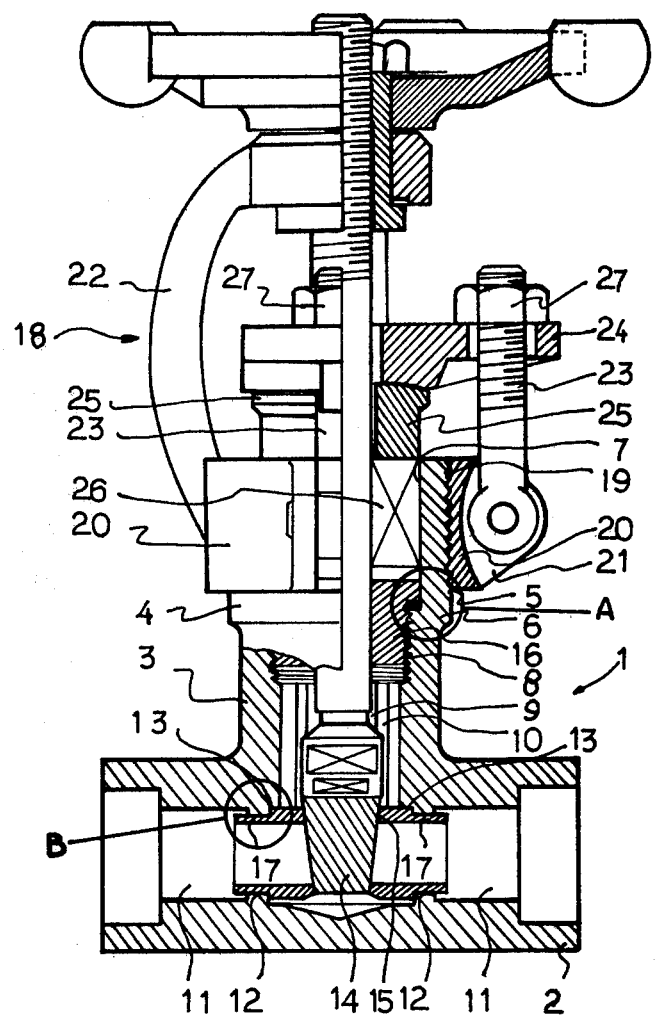
FIG. 1 is a drawing shows a partial vertical sectional view, as well as a part of a view perpendicular to the cutting plane of said section, of a bonnetless compact design gate valve according to this invention.
Figure 2:
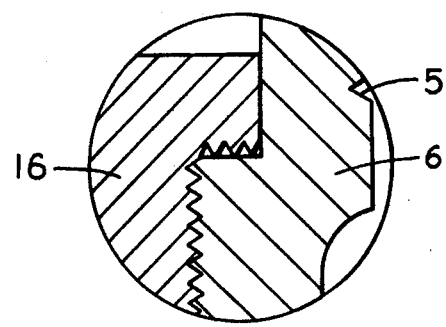
FIG. 2 is an enlarged view of the portion of FIG. 1 marked by circle A.
Figure 3:
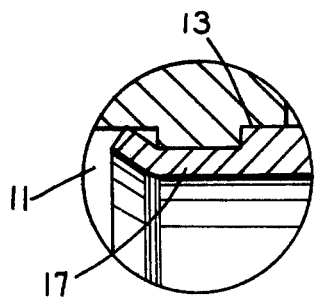
FIG. 3 is an enlarged view of the portion of FIG. 1 marked by circle B and showing the cylindrical portion of the seat ring in bent condition.

The present invention is described in detail hereinbelow in accordance with the accompanying drawing.

The drawing illustrates a partial section of a preferred embodiment of bonnetless compact design gate valve according to this invention. In this drawing, in order to facilitate the understanding, there is shown a situation wherein the cylindrical end of the seat ring 15 is not yet bent. The body I consists of a horizontal portion 2 having a circular sectional shape and a vertical portion 3 also having a circular sectional shape and provided at in the center of said horizontal portion 2, said body portions 2 and 3 being formed integral with each other by stamp forging. Carbon steel, 3½ nickel steel, 18% chromium and 8% nickel stainless steel or the like is used as the material for producing the body 1. Unlike the conventional outside-screw type gate valves, no thick flange is provided at the top end of the vertical body portion 3 for joining to the bonnet. Instead, there is provided a body head portion 4 having a slightly greater diameter than the middle part of the vertical body portion 3. On the outer peripheral surface of said body head portion 4 is provided a screw 5 for screw-joining a yoke 18 thereto. No such screw 5 is provided at the lower end portion 6 of said body head portion 4 so that the yoke screw portion 19 is checked at said lower end portion 6. The length of said screw 5 is determined with a certain allowance so that the upper end face of the yoke screw portion 19 will become flush with the corresponding upper end face of the vertical body portion 3. In said vertical body portion is also provided a stuffing box 7 which opens to a central part of the end face of said body head portion 4. This stuffing box 7 has a proper depth so as not to cause any leakage of the fluid and also has a diameter large enough to allow passage of the wedge-shaped gate 14. It is desirable that said stuffing box 7 is provided at the body head portion 4 of the vertical body 3. This permits formation of the vertical body portion 3 with a substantially uniform wall thickness. At the lower part of the stuffing box 7 there is provided an inside screw portion 8 which is slightly smaller in diameter than the stuffing box 7. A flanged cylindrical buck seat ring 16 having a screw on its outer periphery is screwed into said inside screw portion 8 and thereby fixed in position. Said buck seat ring 16 has its flange secured to the lower end face of the stuffing box 7 to inhibit penetration of the fluid from the inside screw portion 8. In order to further expedite this function, it is desirable to provide the grooves having the thread-like ridges around the back side of said flange. At the lower part of said inside screw portion 8 are also formed a guide hole 9 and guide grooves 10 for guiding the gate 14. Said guide hole 9 is a circular hole having a diameter slightly smaller than the catercorner length of the rectangular upper end face of the wedge-shaped gate 14, and the cut-out guide grooves 10 designed for guiding the four corners of the rectangular upper end face of the gate 14 are provided at four locations along the periphery of said circular hole.

In the horizontal body portion 2 there is formed a fluid conduit hole 11 opening to both end faces of said body portion, and two seat rings 15 are secured in opposed relation to each other at the intersection of said fluid conduit hole 11 and the guide hole 9 for the gate 14. In the conventional gate valves, each seat ring 15 has its spot face 13 provided at the edge of the intersection of the guide hole 9 and fluid conduit hole 11, said spot face 13 being formed greater in diameter than the fluid conduit hole 11, and the flange of said seat ring 15 is loosely fitted to said spot face 13 and the cylindrical portion 17 of said seat ring is internally expanded with the back side of the flange being kept attached to said spot face 13 to thereby fix the seat ring in an outwardly pressed state. In the present invention, unlike the said conventional fixing method by face-to-face pressed contact of the cylindrical portion 17 and fluid conduit hole 11, a fixing surface portion 12 having a slightly smaller diameter than the fluid conduit hole 11 is provided contiguous to said spot face 13 in the conduit hole 11. Said fixing surface portion 12 has a length slightly smaller than the length of the cylindrical portion 17 of the seat ring 15. According to this arrangement, when the cylindrical portion 17 of the seat ring 15 is expanded in the fluid conduit hole 11, the major part of the cylindrical portion 17 is brought into facial contact against the fixing surface portion 12, but the end of the cylindrical portion 17 is bent and bites into the stepped edge of the fixing surface portion 12 and is thereby fixed. It is desirable to chamfer the inner peripheral edge of the cylindrical portion 17 to facilitate the internal expansion. The thus fixed cylindrical portion 17 of the seat ring 15 is under a tensile stress and secured in position with a slight elongation. Therefore, when the valve is used for passing a fluid with a relatively low temperature, the seat ring 15 is fixed in a tightly attached state by dint of the tensile stress of the cylindrical portion 17 and pressed contact with the fixing surface portion 12. Also, in case the fluid passed is of a high temperature, although the cylindrical portion 17 of the seat ring 15 stretches owing to the difference in linear expansion coefficient between the body 1 and the seat ring 15, such stretch merely eases the tensile stress of the cylindrical portion 17 and causes no relative stretch between the cylindrical portion 17 and the fixing surface portion 12, so that the seat ring 15 is fixed stably with no chance of loosening even when used under a high temperature condition. Also, the yoke 18 joined to the head portion 4 of the vertical body portion 3, unlike the conventional yokes, has a ring-like fixing portion 20 provided on its inner peripheral surface with a screw portion 19 arranged to threadedly engage with the corresponding screwed portion 5 of the body head portion 4. This fixing portion 20 is substantially equal in length to the screwed portion 5 of the body head portion 4. Also, on the outer peripheral surface of said fixing portion 20, there are integrally provided two arm portions 21 spaced-apart from each other at the opposing positions and two similarly spaced-apart opposing stanchion portions 22 at the positions with an angular difference of about 90° from said respective arm portions 21. The fixing portion 20 stays free of any other force than the clamping force of the gate acting to the yoke screw portion 19. Also, since said arm portions 21 and stanchion portions 22 function as a reinforcement, the fixing portion 20 may be of a small wall thickness. This leads to a significant weight reduction in comparison with the conventional valves of this type. Further, a gland bolt 23 is pivoted to each of the two arm portions 21, and a pressing force is given to a gland flange 24 and a gland 25 separate from said gland flange 24 by adjusting a gland nut 27 which mates with said gland bolt 23, thereby to maintain under airtight pressure the packing 26 stuffed in the stuffing box 7. Thus, this packing 26 section is the only part of the gate where there is a possibility of fluid leakage, but since the clamping force of the packing 26 can be adjusted, even if any leakage of the fluid occurs in use of the valve, such leakage can be easily stopped by increasing the pressing force on the packing 26.

INDUSTRIAL APPLICABILITY

The bonnetless compact design gate valve according to this invention is suited for use as a high temperature valve employed in the petrochemical apparatuses having an essential necessity of piping with a plurality of valves by a prefabrication construction method or offered to services at high temperatures. It is also suited for uses where a low temperature fluid such as liquefied petroleum gas or liquefied natural gas is used.

What is claimed is:

1. A gate valve, comprising: a valve body having an elongated hollow main body portion and a hollow branch body portion extending transversely from said main body portion between the longitudinal ends thereof, said main body portion having a straight flow passage of circular cross section extending lengthwise thereof, said branch body portion having a central cylindrical internal opening extending perpendicular to said straight flow passage and the inner end of which internal opening intersects said straight flow passage, said main body portion having a pair of annular ridges projecting inwardly from the wall of said straight flow passage, said ridges being located on opposite longitudinal sides of and close to the intersection of said straight flow passage and said internal opening, said ridges each having an elongated internal wall which extends parallel with the axis of said flow passage and having radially outwardly extending end walls at the ends of said internal wall, said internal walls of said ridges defining a pair of fixing surface portions having smaller diameters than the portions of said flow passage on opposite sides thereof; a pair of coaxial annular seat rings respectively disposed in said flow passage and extending in opposite longitudinal directions from the intersection of said flow passages and said internal opening, said seat rings having opposed, axially spaced-apart end walls defining valve seats, said seat rings each having a shoulder which abuts against the axially inner end wall of the adjacent ridge and a cylindrical portion which is of greater length than the internal wall of the adjacent ridge and which extends along that internal wall and thence outwardly beyond the axially outer end wall of that ridge, the cylindrical portions of said seat rings being expanded so that the section of said cylindrical portion that is disposed within the internal wall of the adjacent ridge is expanded into facial contact therewith and the remainder of said cylindrical portion is bent radially outwardly so that the edge thereof bites into the wall of said flow passage; said internal opening of said branch body portion including a gate guide chamber extending axially outwardly from said flow passage, said gate guide chamber having a guide hole and guide grooves in the wall thereof; an inside screw threaded portion extending axially outwardly from the outer end of said gate guide chamber and a stuffing box chamber extending axially outwardly from the outer end of said inside screw threaded portion to the outer end of said branch body portion, said stuffing box chamber being of larger diameter than said inside screw threaded portion and having an annular end face at the inner end thereof which end face extends radially inwardly to the outer end of said inside screw threaded portion; a yoke having an internally screw threaded annular fixing portion which is screw threaded onto said branch body portion; a valve operating screw having a stem that extends through said internal opening of said branch body portion, a gate mounted on the inner end of said stem for movement within said gate guide chamber toward and away from sealing engagement with said valve seats; an annular seat ring sleeved on said stem, said seat ring having an externally threaded portion at the inner end thereof and which is screw threaded into said inside screw thread portion of said internal opening of said branch body portion, said seat ring having a radially outwardly projecting annular flange at the outer end thereof and projecting into said stuffing box chamber, said flange having an inner annular surface opposed to said annular end face of said stuffing box chamber.

2. A gate valve according to claim 1 wherein said branch body portion has a radially outwardly enlarged head portion, said enlarged head portion being externally screw threaded from the outer end thereof to a location close to but spaced outwardly from the inner end of said enlarged head portion, the internally screw threaded annular fixing portion of said yoke being screw threaded onto said head portion so that the inner end of the screw thread of said annular fixing portion is bottomed on the inner end of the external screw thread of said enlarged end portion.

3. A gate valve according to claim 1 in which said inner annular surface of said flange of said seat ring has ridges which bite into said annular end face to prevent leakage of fluid therepast.

* * * * *